United States Patent
Tanaka

(10) Patent No.: US 12,536,829 B2
(45) Date of Patent: Jan. 27, 2026

(54) ELECTROMAGNETIC WAVE SENSOR DEVICE AND DISPLAY DEVICE

(71) Applicant: SHARP KABUSHIKI KAISHA, Sakai (JP)

(72) Inventor: Yuhji Tanaka, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 493 days.

(21) Appl. No.: 18/013,182

(22) PCT Filed: Jun. 30, 2020

(86) PCT No.: PCT/JP2020/025640
§ 371 (c)(1),
(2) Date: Dec. 27, 2022

(87) PCT Pub. No.: WO2022/003813
PCT Pub. Date: Jan. 6, 2022

(65) Prior Publication Data
US 2023/0243703 A1 Aug. 3, 2023

(51) Int. Cl.
*H10K 39/34* (2023.01)
*G01J 5/00* (2022.01)
*G06V 40/13* (2022.01)
*G06V 40/12* (2022.01)

(52) U.S. Cl.
CPC ........ *G06V 40/1318* (2022.01); *G01J 5/0025* (2013.01); *H10K 39/34* (2023.02); *G06V 40/1394* (2022.01)

(58) Field of Classification Search
CPC .......... H10F 39/10; H10F 39/12; H10F 30/20; H10F 77/12; H05B 33/12; H05B 33/14; H10K 39/34; H10K 50/115; H10K 2102/3031; H10K 59/35; G01J 5/28;
(Continued)

(56) References Cited

U.S. PATENT DOCUMENTS

2010/0181552 A1  7/2010 So
2011/0031399 A1  2/2011 So
2011/0031403 A1  2/2011 So
(Continued)

FOREIGN PATENT DOCUMENTS

JP   2007234771 A   9/2007
JP   2010506386 A   2/2010
WO   WO-2019082120 A1 *  5/2019

*Primary Examiner* — Peter J Macchiarolo
*Assistant Examiner* — Mireille S Sadate-Moualeu
(74) *Attorney, Agent, or Firm* — ScienBiziP, P.C.

(57) ABSTRACT

An electromagnetic wave sensor device according to an aspect of the disclosure, comprising: a first sensor configured to perform an output in accordance with electromagnetic waves absorbed by a first quantum dot, an upper limit wavelength of electromagnetic waves absorbable by the first quantum dot being a first wavelength, a second sensor configured to perform an output in accordance with electromagnetic waves absorbed by a second quantum dot different from the first quantum dot, an upper limit wavelength of electromagnetic waves absorbable by the second quantum dot being a second wavelength longer than the first wavelength; and a calculation unit configured to calculate a difference between the output of the second sensor and the output of the first sensor.

13 Claims, 17 Drawing Sheets

(58) Field of Classification Search
CPC ......... G01J 5/0853; G01J 5/0025; G09F 9/30; G06V 40/1318; G06V 40/1394
See application file for complete search history.

(56) References Cited

U.S. PATENT DOCUMENTS

2013/0206988 A1    8/2013   So
2018/0299326 A1*   10/2018   Kitazawa ................. G01J 5/20

* cited by examiner

ELECTROMAGNETIC WAVE SENSOR DEVICE AND DISPLAY DEVICE

TECHNICAL FIELD

The disclosure relates to an electromagnetic wave sensor device and a display device.

BACKGROUND ART

In the related art. there is known a sensor (hereinafter sometimes referred to as a quantum dot sensor) that performs an output in accordance with electromagnetic waves absorbed by a quantum dot. Here, the electromagnetic waves are typically light (e.g., visible light, ultraviolet rays, and infrared rays).

CITATION LIST

Patent Literature

PTL 1: JP 2010-506386 T (published on Feb. 25, 2010)
PTL 2: JP 2007-234771 A (published on Sep. 13, 2007)

SUMMARY

Technical Problem

The quantum dot sensor can absorb electromagnetic waves in a predetermined wavelength range. In general, the upper limit of the wavelength range is determined, while the lower limit of the wavelength range is not determined. Thus, it is difficult for the quantum dot sensor to selectively absorb only electromagnetic waves in a desired wavelength range.

From the above, there occurs a problem that in an electromagnetic wave sensor device that detects electromagnetic waves using the quantum dot sensor, it is difficult to selectively detect only electromagnetic waves in a desired wavelength range.

One aspect of the disclosure is to fabricate an electromagnetic wave sensor device that can selectively detect only electromagnetic waves in a desired wavelength range.

Solution to Problem

An electromagnetic wave sensor device according to one aspect of the disclosure includes a first sensor configured to perform an output in accordance with electromagnetic waves absorbed by a first quantum dot, an upper limit wavelength of electromagnetic waves absorbable by the first quantum dot being a first wavelength; a second sensor configured to perform an output in accordance with electromagnetic waves absorbed by a second quantum dot different from the first quantum dot, an upper limit wavelength of electromagnetic waves absorbable by the second quantum dot being a second wavelength longer than the first wavelength; and a calculation unit configured to calculate a difference between the output of the second sensor and the output of the first sensor.

A display device according to one aspect of the disclosure includes a display panel configured to perform display by visible light, and the display panel includes at least one electromagnetic wave sensor device being the electromagnetic wave sensor device in which both the first quantum dot and the second quantum dot can absorb visible light.

Advantageous Effects of Disclosure

According to one aspect of the disclosure, it is possible to fabricate an electromagnetic wave sensor device that can selectively detect only electromagnetic waves in a desired wavelength range.

DESCRIPTION OF EMBODIMENTS

Figure 1:
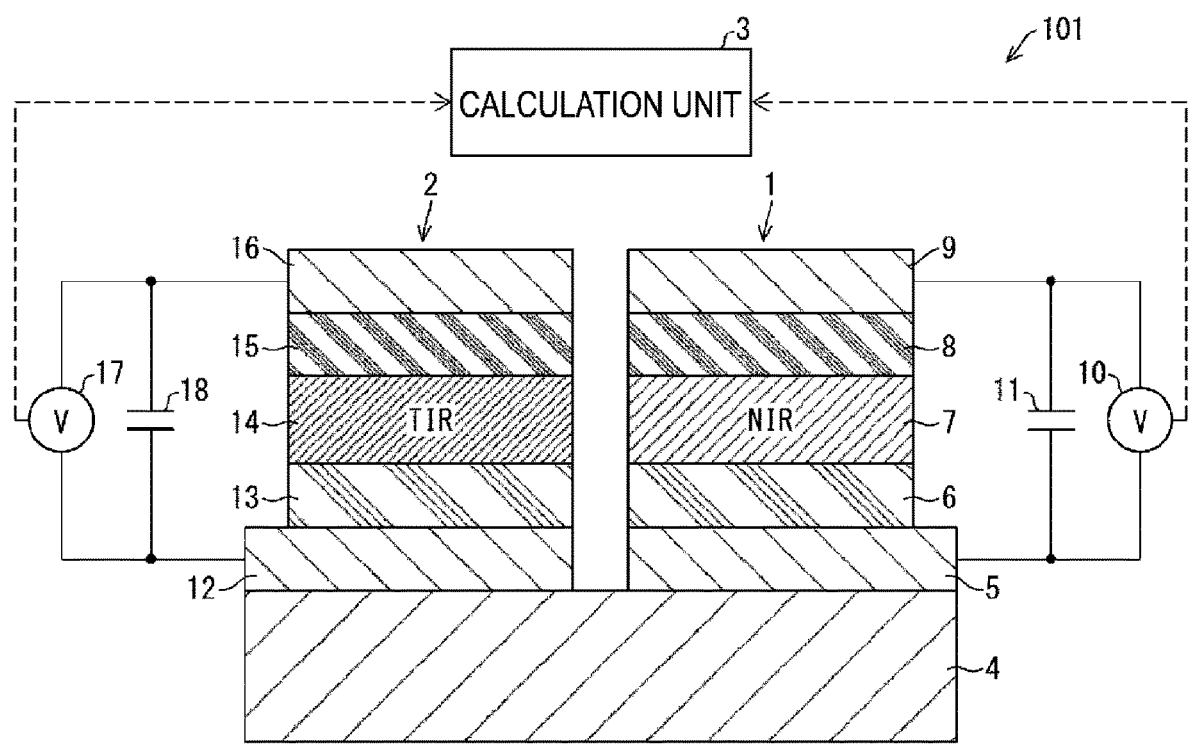
FIG. 1 is a diagram illustrating a schematic configuration of an electromagnetic wave sensor device according to a first embodiment of the disclosure.

Embodiments of the disclosure will be described below. Note that, for convenience of description, members having the same functions as the members described earlier may be denoted by the same reference numerals and signs, and the description thereof will not be repeated.

First Embodiment

FIG. 1 is a diagram illustrating a schematic configuration of an electromagnetic wave sensor device 101 according to the present embodiment. The electromagnetic wave sensor device 101 includes a first sensor 1, a second sensor 2, a calculation unit 3, and a thin film transistor (TFT) substrate 4.

As illustrated in FIG. 1, the first sensor 1 is provided with respect to the TFT substrate 4. The first sensor 1 includes an electrode 5, an electron transport layer 6, a near infrared (NIR) absorption layer 7, a hole transport layer 8, and an electrode 9. The first sensor 1 has a structure in which the electrode 5, the electron transport layer 6, the NIR absorption layer 7, the hole transport layer 8, and the electrode 9 are layered in this order. A parallel circuit of a voltmeter 10 and a capacitor 11 is connected between the electrode 5 and the electrode 9. The voltmeter 10 measures a voltage generated when the NIR absorption layer 7 absorbs electromagnetic waves. The capacitor 11 is provided to convert a current generated in the first sensor 1 into a voltage. As long as a current value generated in the first sensor 1 can be accurately measured, another configuration may be used.

The second sensor 2 is provided with respect to the TFT substrate 4 and is disposed adjacent to the first sensor 1. The second sensor 2 includes an electrode 12, an electron transport layer 13, a thermal infrared (TIR) absorption layer 14, a hole transport layer 15, and an electrode 16. The second sensor 2 has a structure in which the electrode 12, the electron transport layer 13, the TIR absorption layer 14, the hole transport layer 15, and the electrode 16 are layered in this order. A parallel circuit of a voltmeter 17 and a capacitor 18 is connected between the electrode 12 and the electrode 16. The voltmeter 17 measures a voltage generated when the TIR absorption layer 14 absorbs electromagnetic waves. The capacitor 18 is provided to convert a current generated in the second sensor 2 into a voltage. As long as a current value generated in the second sensor 2 can be accurately measured, another configuration may be used.

The TFT substrate 4 is provided with a plurality of TFTs. The TFT substrate 4 is used to flow, in a certain direction, and amplify charges generated in the first sensor 1 and the second sensor 2. The electrode 5 constitutes a cathode electrode of the first sensor 1. The electrode 9 constitutes an anode electrode of the first sensor 1. The electrode 12 constitutes a cathode electrode of the second sensor 2. The electrode 16 constitutes an anode electrode of the second sensor 2. The electron transport layer 6 is an electron transport layer that transports, to the electrode 5, electrons generated when the NIR absorption layer 7 absorbs electromagnetic waves. The hole transport layer 8 is a hole transport layer that transports, to the electrode 9, holes generated when the NIR absorption layer 7 absorbs electromagnetic waves. The electron transport layer 13 is an electron transport layer that transports, to the electrode 12, electrons generated when the TIR absorption layer 14 absorbs electromagnetic waves. The hole transport layer 15 is a hole transport layer that transports, to the electrode 16, holes generated when the TIR absorption layer 14 absorbs electromagnetic waves. As each of the electrode 5, the electron transport layer 6, the hole transport layer 8, the electrode 9, the electrode 12, the electron transport layer 13, the hole transport layer 15, and the electrode 16, a known one in the field of the quantum dot sensor can be applied.

The NIR absorption layer 7 includes a first quantum dot, which is a type of quantum dots. The first quantum dot can absorb electromagnetic waves, and an upper limit wavelength of electromagnetic waves that can be absorbed by the first quantum dot is a first wavelength. The first wavelength is approximately 5 µm, for example.

In other words, the first sensor 1 performs an output in accordance with electromagnetic waves absorbed by the first quantum dot, and the upper limit wavelength of electromagnetic waves that can be absorbed by the first quantum dot is the first wavelength. The first sensor 1 itself can be achieved by a well-known technique.

The TIR absorption layer 14 includes a second quantum dot, which is a type of quantum dots. The second quantum dot can absorb electromagnetic waves, and an upper limit wavelength of electromagnetic waves that can be absorbed by the second quantum dot is a second wavelength. The second wavelength is longer than the first wavelength. The second wavelength is approximately 10 µm, for example.

In other words, the second sensor 2 performs an output in accordance with electromagnetic waves absorbed by the second quantum dot, and the upper limit wavelength of electromagnetic waves that can be absorbed by the second quantum dot is the second wavelength longer than the first wavelength. The second sensor 2 itself can be achieved by a well-known technique.

The calculation unit 3 calculates a difference between the output of the second sensor 2 and the output of the first sensor 1. Specifically, the calculation unit 3 reads values of the voltmeters 10 and 17 and calculates the difference therebetween. How to determine the difference is performed using an analog circuit such as an operational amplifier. The calculation unit 3 outputs a result of the calculation. The output of the calculation unit 3 corresponds to a detection result of electromagnetic waves by the electromagnetic wave sensor device 101. In FIG. 1, the calculation unit 3 is not formed on the TFT substrate 4, but the calculation unit 3 may be formed on the TFT substrate 4. For example, the calculation unit 3 may be built separately using an ADC (described below) and a digital circuit.

Figure 2:
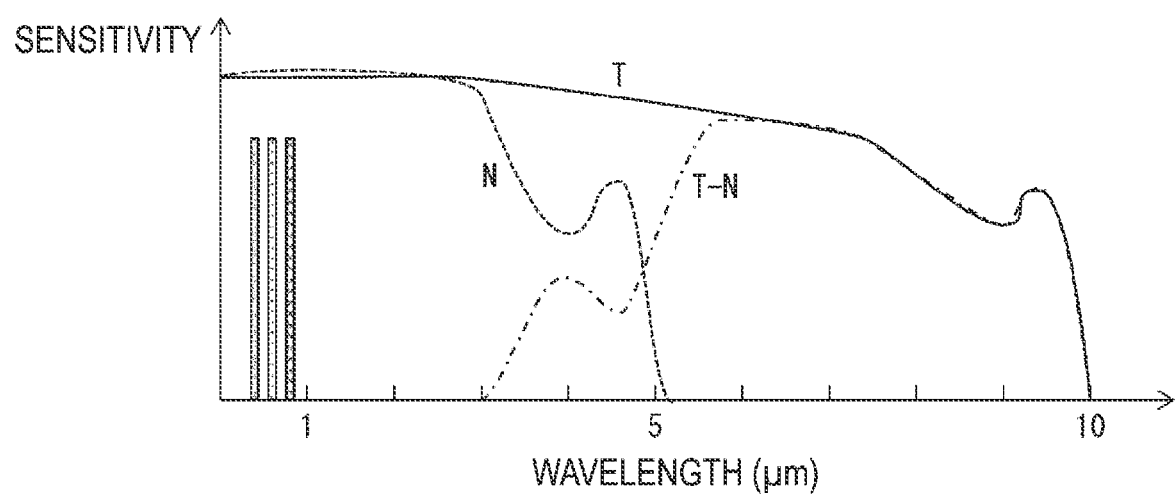
FIG. 2 is a graph showing a relationship between a sensitivity of a first sensor to electromagnetic waves, a sensitivity of a second sensor to electromagnetic waves, and a difference between the sensitivity of the first sensor to the electromagnetic waves and the sensitivity of the second sensor to the electromagnetic waves.

FIG. 2 is a graph showing a relationship between a sensitivity (first sensitivity N) of the first sensor 1 to electromagnetic waves, a sensitivity (second sensitivity T) of the second sensor 2 to electromagnetic waves, and a difference (third sensitivity T-N) between the sensitivity of the first sensor 1 to the electromagnetic waves and the sensitivity of the second sensor 2 to the electromagnetic waves. In the graph shown in FIG. 2, the horizontal axis indicates a wavelength of electromagnetic waves (unit: µm). In the graph shown in FIG. 2, the vertical axis indicates the above-described sensitivities (no unit because no numerical value is shown and only a relative magnitude is shown). In other words, the third sensitivity T-N is a sensitivity to electromagnetic waves corresponding to the calculation result by the calculation unit 3, and thus is a sensitivity of the electromagnetic wave sensor device 101 to the electromagnetic waves.

From the graph shown in FIG. 2, it can be found that the upper limit of the first sensitivity N is approximately 5 µm, and the upper limit of the second sensitivity T is approximately 10 µm. On the other hand, each of the first sensitivity N and the second sensitivity T is sufficiently high from the upper limit to a point at which the wavelength of the electromagnetic waves is 0 µm, and thus, it can be recognized that there is no lower limit. The upper limit of the third sensitivity T-N is the same as the upper limit of the second sensitivity T, and is approximately 10 µm. The lower limit of the third sensitivity T-N is the same as the upper limit of the first sensitivity N, and is approximately 5 µm.

By using a sensor that performs an output in accordance with electromagnetic waves absorbed by a quantum dot, it is possible to significantly improve a detection sensitivity of electromagnetic waves, particularly a detection sensitivity of infrared rays, as compared to a case where a sensor including a thermopile, a photodiode, or the like is used. As to the detection sensitivity of infrared rays, it is known that a sensor that performs an output in accordance with electromagnetic waves absorbed by a quantum dot has an equal to or more than 5-fold greater sensitivity than a sensor that performs an output in accordance with electromagnetic waves absorbed by Si (silicon).

Here, no lower wavelength limit of electromagnetic waves that can be absorbed by a quantum dot is determined, and thus, it is difficult to selectively detect only electromagnetic waves having a desired wavelength by using only one sensor that performs an output in accordance with electromagnetic waves absorbed by a quantum dot. Accordingly, by calculating a difference between the output of the second sensor 2 and the output of the first sensor 1, only electromagnetic waves having a desired wavelength (i.e., greater than the first wavelength and equal to or less than the second wavelength) can be selectively detected.

The first sensor 1 detects electromagnetic waves in the NIR absorption layer 7, and the second sensor 2 detects electromagnetic waves in the TIR absorption layer 14. Thus, in the electromagnetic wave sensor device 101, the first wavelength is a wavelength of near-infrared rays, and the second wavelength is a wavelength of thermal infrared rays. However, as long as the second wavelength is greater than the first wavelength, it is not essential that the first wavelength is the wavelength of near-infrared rays, or the second wavelength is the wavelength of thermal infrared rays. Examples of the first wavelength other than the wavelength of near-infrared rays include a wavelength of visible light. Examples of the second wavelength other than the wavelength of thermal infrared rays include a wavelength of far-infrared rays.

As described above, the first wavelength, which is the upper limit wavelength of electromagnetic waves that can be absorbed by the first quantum dot, is approximately 5 μm, for example. A quantum dot with which the first wavelength can be achieved and which can be used as the first quantum dot is, for example, a Group IV-VI semiconductor including Pb or a Group III-V semiconductor including In. More specifically, for example, PbS, PbSe, or InAs (indium arsenic) can be used. Alternatively, for example, a ternary quantum dot such as PbSSe can also be used. Furthermore, for example, a quantum dot including Te of the same group genus in place of S or Se can also be used.

On the other hand, as described above, the second wavelength, which is the upper limit wavelength of electromagnetic waves that can be absorbed by the second quantum dot, is approximately 10 μm, for example. A quantum dot with which the second wavelength can be achieved and which can be used as the second quantum dot is, for example, a Group III-V semiconductor including In or Ga. More specifically, for example, InAs or GaAs can be used. Alternatively, for example, a ternary quantum dot such as InGaAs can also be used. Furthermore, a quantum dot including P of the same group in place of As can also be used, for example.

Note that a semiconductor quantum dot has an absorption characteristic of electromagnetic waves, which greatly changes depending on not only the material but also the particle size thereof. For example, in the above, InAs can be used for both the first quantum dot and the second quantum dot.

Depending on the material, size, and thickness of the NIR absorption layer 7, a variation in output of the first sensor 1 may be generated. Similarly, depending on the material, size, and thickness of the TIR absorption layer 14, a variation in output of the second sensor 2 may be generated. For reducing an error of a detection result of the electromagnetic wave sensor device 101 due to these variations, the calculation unit 3 may perform so-called weighting processing. In this weighting processing, the output of the second sensor 2 and/or the output of the first sensor 1 may be multiplied by a constant. Alternatively, in this weighting processing, the output of the second sensor 2 and/or the output of the first sensor 1 may be multiplied by a variable that non-linearly changes in accordance with the output level of the second sensor 2 and/or the output level of the first sensor 1.

Second Embodiment

Figure 3:
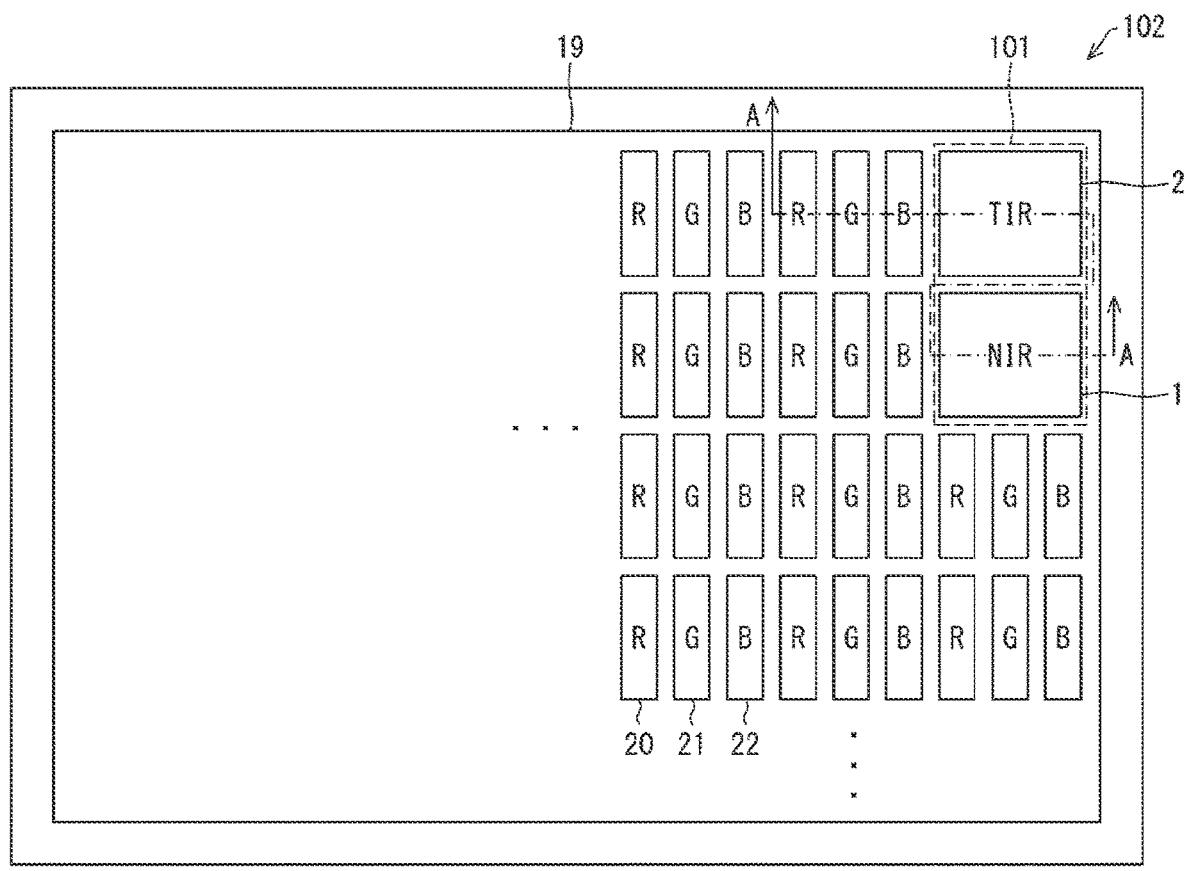
FIG. 3 is a diagram illustrating a schematic configuration of a display device according to a second embodiment of the disclosure.
Figure 4:
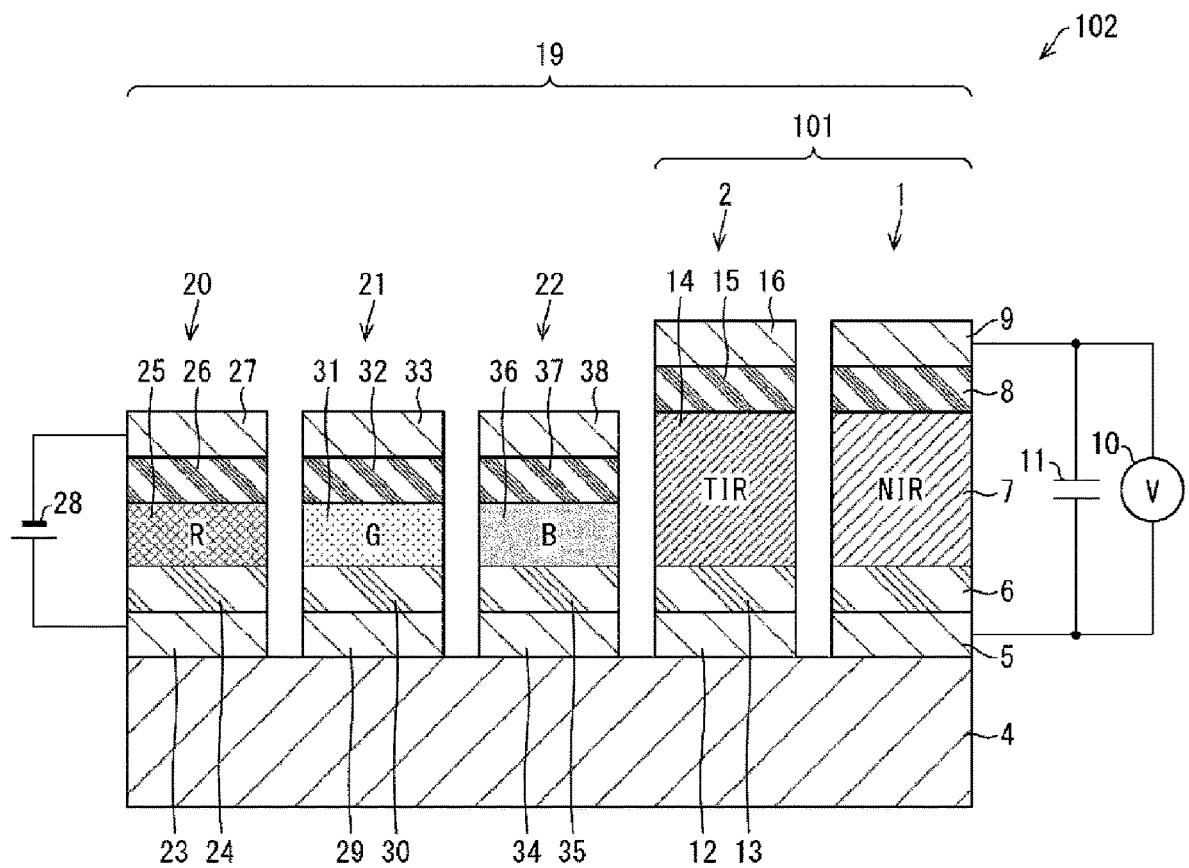
FIG. 4 is a cross-sectional view taken along arrow A-A in FIG. 3.

FIG. 3 is a diagram illustrating a schematic configuration of a display device 102 according to the present embodiment. FIG. 4 is a cross-sectional view taken along arrow A-A in FIG. 3. The display device 102 includes a display panel 19 and the electromagnetic wave sensor device 101.

As illustrated in FIG. 3, the display panel 19 includes the first sensor 1, the second sensor 2, a plurality of red subpixels 20, a plurality of green subpixels 21, and a plurality of blue subpixels 22. The display panel 19 performs display by visible light, for example. Although not illustrated, the calculation unit 3 may be provided in the display panel 19 or may be provided outside the display panel 19. In this way, the display device 102 includes the first sensor 1, the second sensor 2, and the calculation unit 3. That is, the display device 102 includes the electromagnetic wave sensor device 101.

In the display panel 19, for example, one of the plurality of green subpixels 21, and one of the plurality of red subpixels 20 and one of the plurality of blue subpixels 22 which are disposed on both sides of the one of the plurality of green subpixels 21 form one pixel.

As illustrated in FIG. 4, the red subpixel 20 is provided with respect to the TFT substrate 4. The red subpixel 20 includes an electrode 23, an electron transport layer 24, a quantum dot light-emitting layer (red) 25, a hole transport layer 26, and an electrode 27. The red subpixel 20 has a structure in which the electrode 23, the electron transport layer 24, the quantum dot light-emitting layer (red) 25, the hole transport layer 26, and the electrode 27 are layered in this order. A power source 28 is connected between the electrode 23 and the electrode 27.

The green subpixel 21 is provided with respect to the TFT substrate 4. The green subpixel 21 includes an electrode 29, an electron transport layer 30, a quantum dot light-emitting layer (green) 31, a hole transport layer 32, and an electrode 33. The green subpixel 21 has a structure in which the electrode 29, the electron transport layer 30, the quantum dot light-emitting layer (green) 31, the hole transport layer 32, and the electrode 33 are layered in this order. Although not illustrated in FIGS. 3 and 4, a power source is connected between the electrode 29 and the electrode 33.

The blue subpixel 22 is provided with respect to the TFT substrate 4. The blue subpixel 22 includes an electrode 34, an electron transport layer 35, a quantum dot light-emitting layer (blue) 36, a hole transport layer 37, and an electrode 38. The blue subpixel 22 has a structure in which the electrode 34, the electron transport layer 35, the quantum dot light-emitting layer (blue) 36, the hole transport layer 37, and the electrode 38 are layered in this order. Although not illustrated in FIGS. 3 and 4, a power source is connected between the electrode 34 and the electrode 38.

In addition to the configuration described above, a plurality of TFTs are further formed on the TFT substrate 4. Using the plurality of TFTs of the TFT substrate 4, a voltage is applied to the electrode 23 to drive the red subpixel 20, a voltage is applied to the electrode 29 to drive the green subpixel 21, and a voltage is applied to the electrode 34 to drive the blue subpixel 22.

The electrode 23 constitutes a cathode electrode of the red subpixel 20. The electrode 27 constitutes an anode electrode of the red subpixel 20. The electrode 29 constitutes a cathode electrode of the green subpixel 21. The electrode 33 constitutes an anode electrode of the green subpixel 21. The electrode 34 constitutes a cathode electrode of the blue subpixel 22. The electrode 38 constitutes an anode electrode of the blue subpixel 22.

The electron transport layer 24 is an electron transport layer that transports electrons from the electrode 23 to the quantum dot light-emitting layer (red) 25. The hole transport layer 26 is a hole transport layer that transports holes from the electrode 27 to the quantum dot light-emitting layer (red) 25. The electron transport layer 30 is an electron transport layer that transports electrons from the electrode 29 to the quantum dot light-emitting layer (green) 31. The hole transport layer 32 is a hole transport layer that transports holes from the electrode 33 to the quantum dot light-emitting layer (green) 31. The electron transport layer 35 is an electron transport layer that transports electrons from the electrode 34 to the quantum dot light-emitting layer (blue) 36. The hole transport layer 37 is a hole transport layer that transports holes from the electrode 38 to the quantum dot light-emitting layer (blue) 36.

The quantum dot light-emitting layer (red) 25 includes a quantum dot and emits red light. The quantum dot light-emitting layer (green) 31 includes a quantum dot and emits green light. The quantum dot light-emitting layer (blue) 36 includes a quantum dot and emits blue light.

As each of the red subpixel 20, the green subpixel 21, and the blue subpixel 22, a known one in the field of quantum dot light-emitting elements can be applied.

Furthermore, as illustrated in FIG. 4, the first sensor 1 and the second sensor 2 included in the electromagnetic wave sensor device 101 are also provided with respect to the TFT substrate 4. Note that, in FIG. 4, the voltmeter 17 and the capacitor 18 that are connected to the second sensor 2, and the calculation unit 3 are not illustrated.

FIGS. 5 to 8 show graphs A to D, respectively. The graph A shows an example of electromagnetic waves received by the electromagnetic wave sensor device 101 of the display device 102. The graph B shows degrees of contribution of electromagnetic waves having respective wavelengths to the output of the first sensor 1 generated when the electromagnetic wave sensor device 101 receives the electromagnetic waves. The graph C shows degrees of contribution of electromagnetic waves having respective wavelengths to the output of the second sensor 2 generated when the electromagnetic wave sensor device 101 receives the electromagnetic waves. The graph D shows a difference between the degree of contribution to the output of the second sensor 2 according to the graph C and the degree of contribution to the output of the first sensor 1 according to the graph B. In each of the graph A, the graph B, the graph C, and the graph D shown in FIGS. 5 to 8, the horizontal axis indicates a wavelength (unit: μm) of electromagnetic waves. In the graph A shown in FIG. 5, the vertical axis indicates an intensity of the electromagnetic waves (no unit because a numerical value is not shown and only a relative magnitude is shown). In each of the graph B, the graph C, and the graph D shown in FIGS. 6 to 8, the vertical axis indicates degrees of contribution of electromagnetic waves having respective wavelengths (no unit because a numerical value is not shown and only a relative magnitude is shown).

Figure 5:
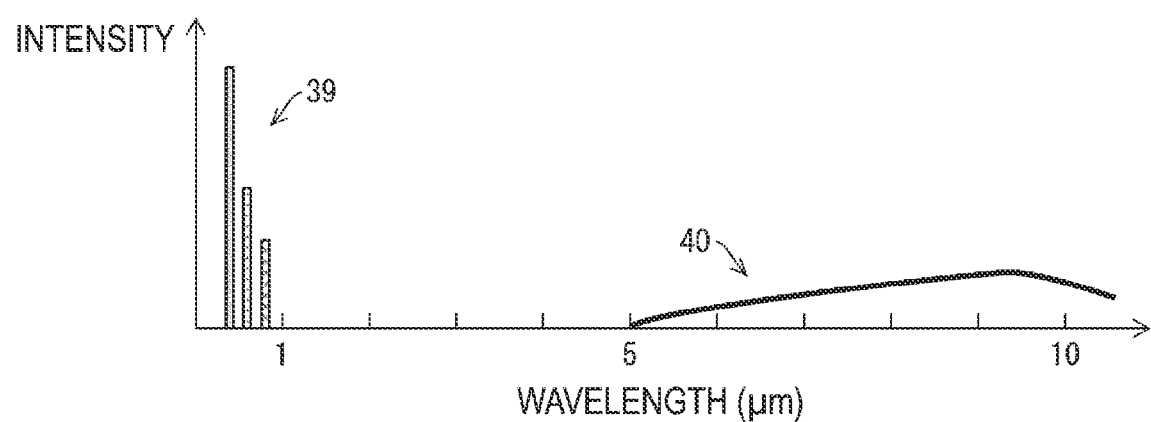
FIG. 5 shows a graph A.

In the graph A shown in FIG. 5, electromagnetic waves 39 and electromagnetic waves 40 are included in the electromagnetic waves received by the electromagnetic wave sensor device 101 of the display device 102. The electromagnetic waves 39 correspond to red, green, and blue light emitted from the display panel 19 and are not to be detected (noise) for the electromagnetic wave sensor device 101. The upper limit of the wavelength range of the electromagnetic waves 39 is less than 1 μm. The electromagnetic waves 40 correspond to infrared rays emitted from a human body, and are to be detected for the electromagnetic wave sensor device 101. The lower limit of the wavelength range of the electromagnetic waves 40 is approximately greater than 5 μm.

Figure 6:
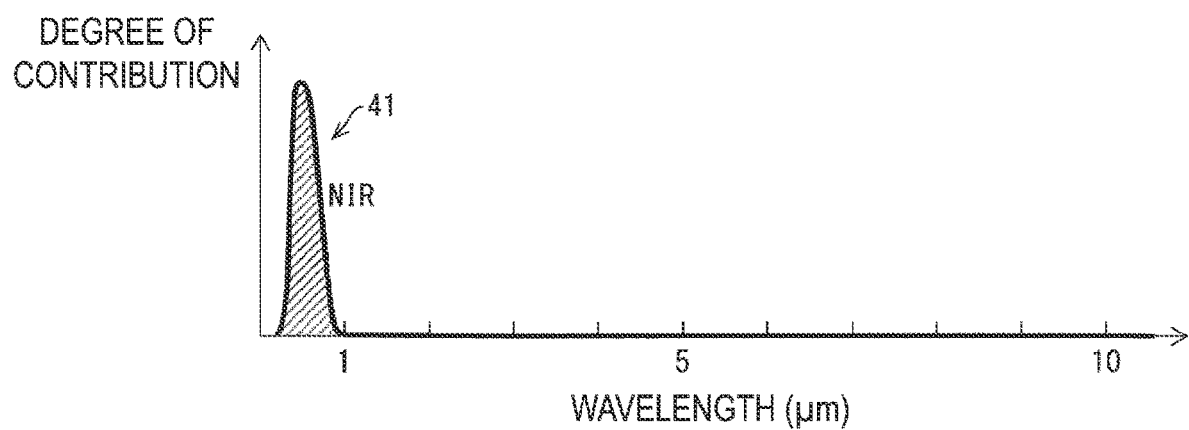
FIG. 6 shows a graph B.

The graph B shown in FIG. 6 corresponds to one obtained by multiplying the intensity distribution of the electromagnetic waves shown in the graph A by the sensitivity distribution of the first sensor 1 shown in FIG. 2. As described above with reference to FIG. 2, the sensitivity of the first sensor 1 to the electromagnetic waves has the upper limit of approximately 5 μm and has no lower limit. Thus, according to the graph B, in the output of the first sensor 1, a component 41 corresponding to the electromagnetic waves 39 is included, while no component corresponding to the electromagnetic waves 40 is included. Note that the output of the first sensor 1 is not a detection value for each wavelength unlike in the graph B but a single value. In more detail, the output of the first sensor 1 is, so to speak, a value obtained by integrating degrees of contribution of the respective wavelengths shown in the graph B in a wavelength direction, and is a value corresponding to the area of a region shaded in FIG. 6. The same applies to the graphs C and D.

Figure 7:
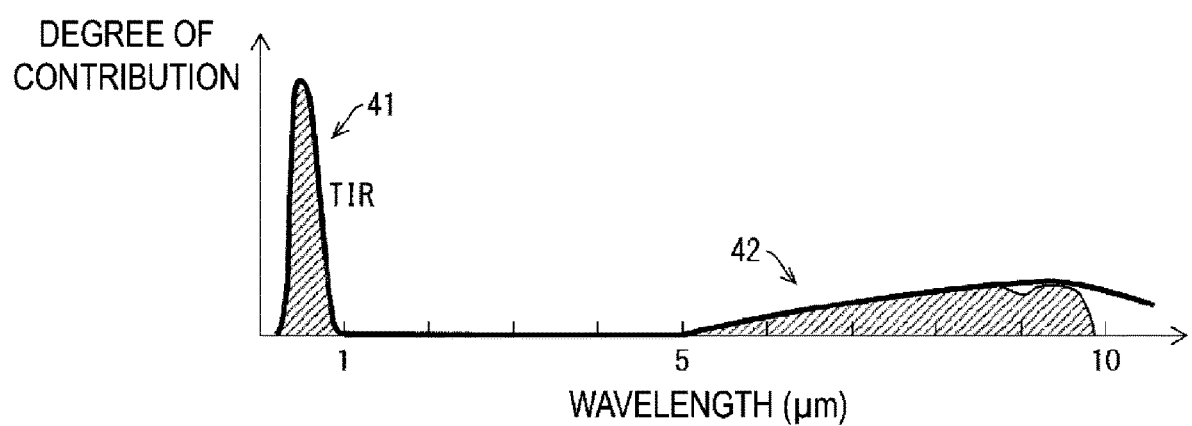
FIG. 7 shows a graph C.

The graph C shown in FIG. 7 corresponds to one obtained by multiplying the intensity distribution of the electromagnetic waves shown in the graph A by the sensitivity distribution of the second sensor 2 shown in FIG. 2. As described above with reference to FIG. 2, the sensitivity of the second sensor 2 to the electromagnetic waves has the upper limit of approximately 10 μm and has no lower limit. Thus, according to the graph C, in the output of the second sensor 2, both the component 41 corresponding to the electromagnetic waves 39 and a component 42 corresponding to the electromagnetic waves 40 are included.

Figure 8:
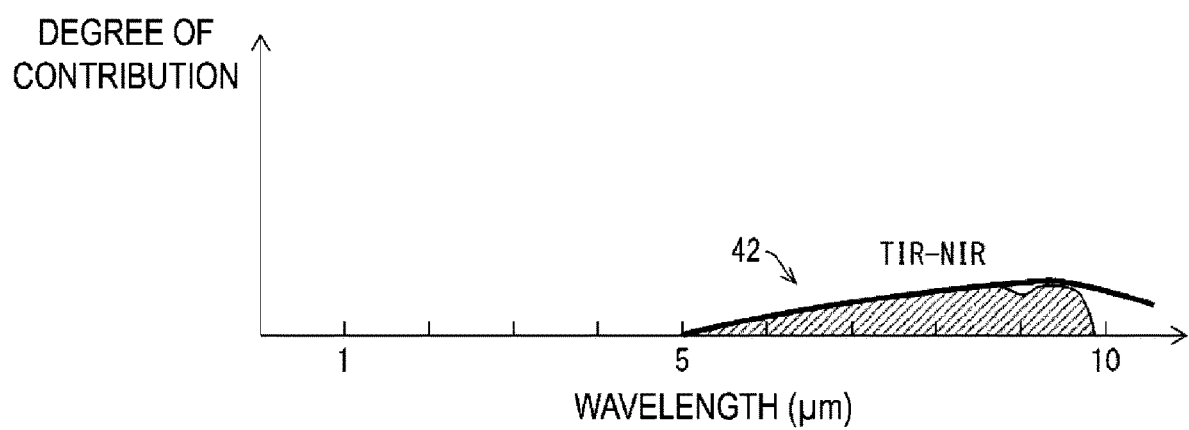
FIG. 8 shows a graph D.

The graph D shown in FIG. 8 corresponds to one obtained by multiplying the intensity distribution of the electromagnetic waves shown in the graph A by a difference between the sensitivity distribution of the first sensor 1 and the sensitivity distribution of the second sensor 2, which is shown in FIG. 2. According to the graph D, the difference between the output of the first sensor 1 according to the graph B and the output of the second sensor 2 according to the graph C includes no component corresponding to the electromagnetic waves 39, while the difference includes the component 42 corresponding to the electromagnetic waves 40.

As to the electromagnetic wave sensor device 101, even when visible light based on display of the display panel 19 is absorbed by the first quantum dot and the second quantum dot, the calculation unit 3 cancels a component related to the visible light. Thus, it is possible to fabricate the display device 102 including the electromagnetic wave sensor device 101 that does not depend on the display of the display panel 19.

The display panel 19 performs display by the red subpixel 20, the green subpixel 21, and the blue subpixel 22, which are quantum dot light-emitting elements. According to the configuration described above, the structure of each of the first sensor 1 and the second sensor 2 can be made substantially the same as the structure of each of the red subpixel 20, the green subpixel 21, and the blue subpixel 22. Thus, the first sensor 1, the second sensor 2, the red subpixel 20, the green subpixel 21, and the blue subpixel 22 can be formed collectively, so that production man-hours can be reduced.

In addition, each of the red subpixel 20, the green subpixel 21, and the blue subpixel 22 does not emit infrared rays, and thus it is not necessary to provide an infrared cut filter on a preceding stage of the first sensor 1 and the second sensor 2. Accordingly, omitting the infrared cut filter can reduce the number of components. Furthermore, omitting the infrared cut filter enables significant suppression of substantial reduction in the sensitivity of the electromagnetic wave sensor device 101 that detects infrared rays as electromagnetic waves.

Note that the display device 102 may be used as a display device on which a human detecting sensor is mounted. In other words, in a case where a level of electromagnetic waves detected by the electromagnetic wave sensor device 101 is a predetermined level or greater (or greater than the predetermined level), display by the display panel 19 may be performed, and in a case where a level of the electromagnetic waves is less than the predetermined level (or the predetermined level or less), display by the display panel 19 may be stopped.

Third Embodiment

Figure 9:
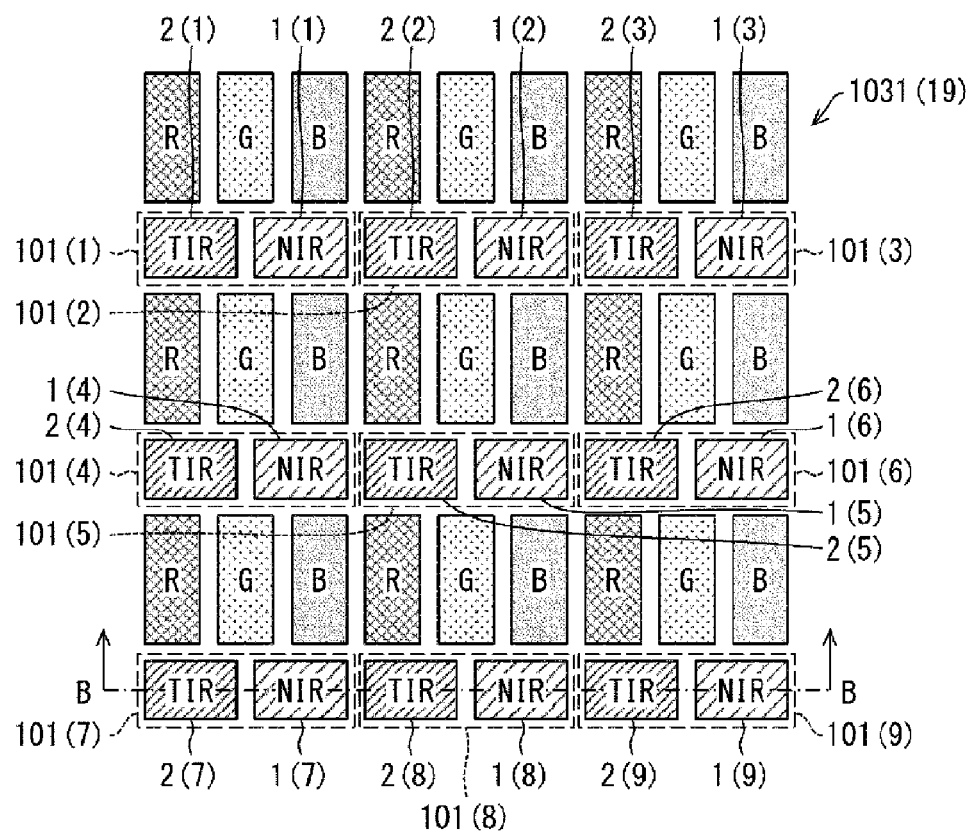
FIG. 9 is a diagram illustrating a schematic configuration of a display device according to a third embodiment of the disclosure.
Figure 10:
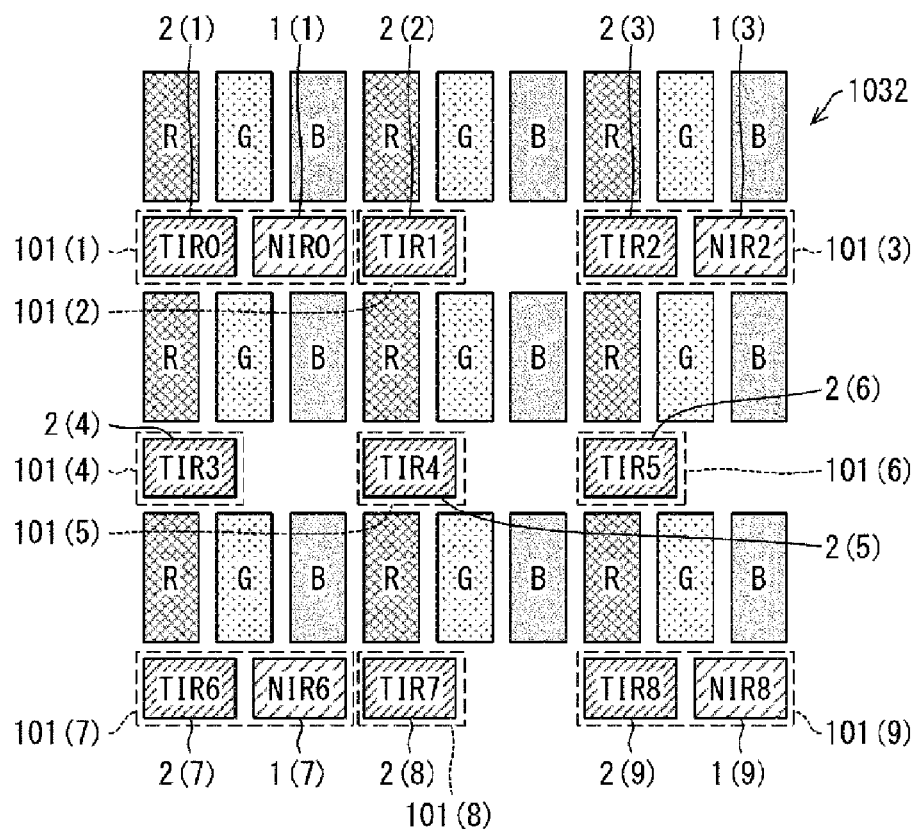
FIG. 10 is a diagram illustrating a schematic configuration of another display device according to the third embodiment of the disclosure.

FIG. 9 is a diagram illustrating a schematic configuration of a display device 1031 according to the present embodiment. FIG. 10 is a diagram illustrating a schematic configuration of another display device 1032 according to the present embodiment. Each of the display device 1031 and the display device 1032 is different from the display device 102 in points described below. In other words, each of the display device 1031 and the display device 1032 includes a plurality of electromagnetic wave sensor devices 101 arranged two-dimensionally.

As illustrated in FIG. 9, in the display device 1031, the plurality of electromagnetic wave sensor devices 101 are arranged in a matrix. Specifically, in the display device 1031, nine electromagnetic wave sensor devices 101(1) to 101(9) are arranged in three rows and three columns. A first sensor 1 of the electromagnetic wave sensor device 101(1) to a first sensor 1 of the electromagnetic wave sensor device 101(9) are denoted as a first sensor 1(1) to a first sensor 1(9), respectively. A second sensor 2 of the electromagnetic wave sensor device 101(1) to a second sensor 2 of the electromagnetic wave sensor device 101(9) are denoted as a second sensor 2(1) to a second sensor 2(9), respectively. Although not illustrated in FIG. 9, for convenience of explanation, a calculation unit 3 of the electromagnetic wave sensor device 101(1) to a calculation unit 3 of the electromagnetic wave sensor device 101(9) are denoted as a calculation unit 3(1) to a calculation unit 3(9), respectively, based on a rule similar to those for the first sensors 1 and the second sensors 2.

As illustrated in FIG. 10, in the display device 1032, at least one first sensor 1 and/or at least one second sensor 2 is removed from a state in which the plurality of electromagnetic wave sensor devices 101 are arranged. Specifically, in the display device 1032, from the arrangement of the nine electromagnetic wave sensor devices 101(1) to 101(9) of the display device 1031, the first sensor 1(2), the first sensor 1(4), the first sensor 1(5), the first sensor 1(6), and the first sensor 1(8) are removed.

Each of the display device 1031 and the display device 1032 can form a display device including an area sensor.

As to the second sensor (x) (x is any one of 2, 4, 5, 6, and 8), the calculation unit $3(x)$ of the electromagnetic wave sensor device $101(x)$ may perform the following calculation. In other words, the output of the first sensor 1 adjacent to the second sensor $2(x)$ is corrected in accordance with a separation distance between the second sensor (x) and the first sensor 1 to determine a correction value AM. The correction value AM is determined for each of a plurality of first sensors 1 adjacent to the second sensor $2(x)$. An average value of a plurality of correction values AM obtained for the plurality of first sensors 1 is determined, and a difference between an output of the second sensor $2(x)$ and the average value is calculated. An example of such calculation is shown in mathematical expression (1) below.

$$M3(5)=S2(5)-(S1(1)+S1(3)+S1(7)+S1(9))/4 \qquad (1)$$

In the mathematical expression,
M3(5)=a calculation result of the calculation unit 3(5),
S2(5)=an output of the second sensor 2(5),
S1(1)=an output of the first sensor 1(1),
S1(3)=an output of the first sensor 1(3),
S1(7)=an output of the first sensor 1(7), and
S1(9)=an output of the first sensor 1(9) are satisfied.

Application Example

Figure 11:
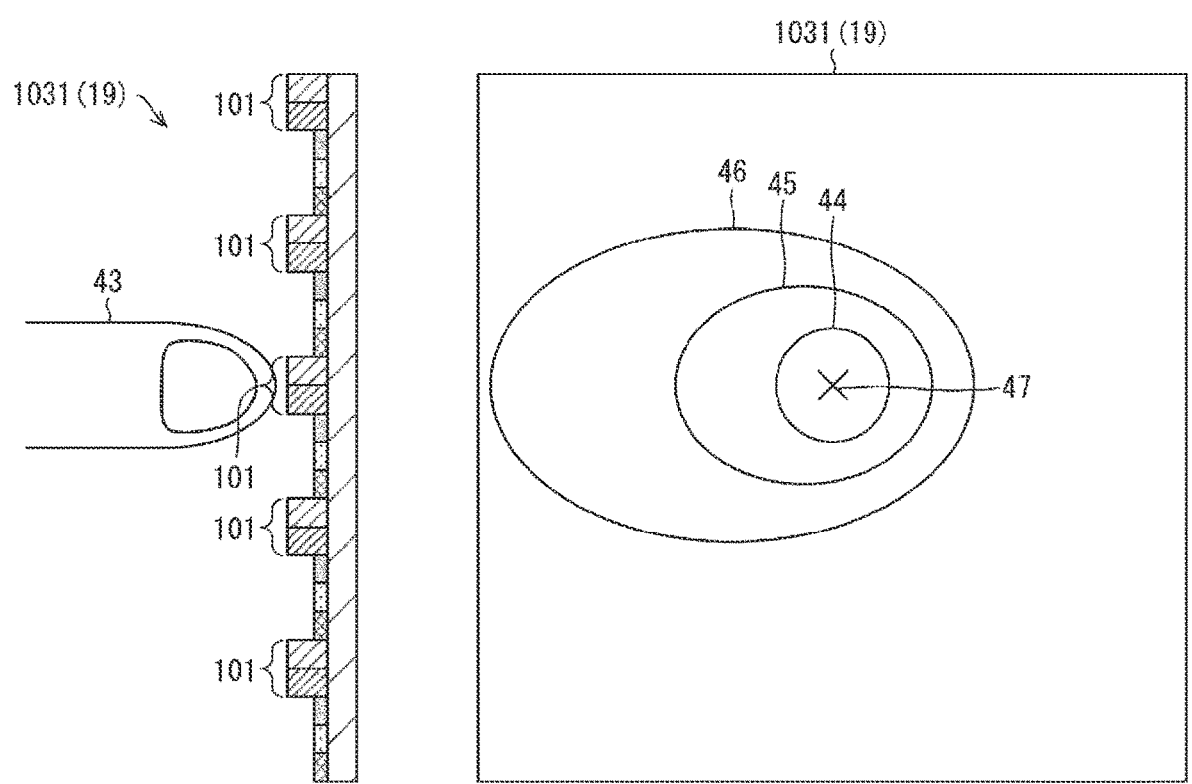
FIG. 11 is a cross-sectional view illustrating an application example of detecting a living body with use of the display device illustrated in FIG. 6 or 7, and a diagram illustrating an example of electromagnetic wave intensity distribution obtained by a plurality of electromagnetic wave sensor devices provided in the display device.

FIG. 11 is a cross-sectional view illustrating an application example of detecting a living body by the display device 1031, and is a diagram illustrating an example of electromagnetic wave intensity distribution obtained by the plurality of electromagnetic wave sensor devices 101 provided in the display device 1031.

Each of the plurality of electromagnetic wave sensor devices 101 absorbs infrared rays as electromagnetic waves. The plurality of electromagnetic wave sensor devices 101 detect the distribution of infrared rays. The display device 1031 detects a finger (an example of the living body, the same applies hereinafter) 43, based on the distribution of infrared rays detected by the plurality of electromagnetic wave sensor devices 101.

Specifically, as illustrated in FIG. 11, when the finger 43 touches the display panel 19 provided in the display device 1031, the plurality of electromagnetic wave sensor devices 101 absorb infrared rays emitted from the finger 43. Then, the plurality of electromagnetic wave sensor devices 101 detect the distribution of infrared rays, based on positions of the plurality of electromagnetic wave sensor devices 101 and intensities of the detected infrared rays.

In accordance with the distribution of infrared rays detected by the plurality of electromagnetic wave sensor devices 101, the finger 43 can be detected in the display device 1031. That is, according to an electromagnetic wave intensity distribution status illustrated in FIG. 11, the intensity distribution of infrared rays obtained by the plurality of electromagnetic wave sensor devices 101 has a contour line shape (also referred to as a concentric circle shape).

A range 44 corresponds to the tip of the finger 43, a range 45 corresponds to the finger 43 and a circumference of the tip of the finger 43, and a range 46 corresponds to a circumference of the finger 43. The intensity of infrared rays in the range 44 is higher than the intensity of infrared rays in the range 45. The intensity of infrared rays in the range 45 is higher than the intensity of infrared rays in the range 46. A center 47 of the range 44 can be considered as corresponding to a position where the finger 43 touches the display panel 19. Based on the intensity distribution of infrared rays represented by the ranges 44 to 46 and the center 47, the finger 43 can be detected in the display device 1031 by a well-known technique.

Note that in the above description, the finger 43 is exemplified as the living body to be detected in the display device 1031, but the living body is not limited to the finger 43. Other examples of the living body include part of a body other than a finger, such as a palm, a vein, and a fingerprint.

In a case of detecting a fingerprint as the living body, the display device 1031 may read, as an image, the distribution of infrared rays detected by the plurality of electromagnetic wave sensor devices 101 and retrieve high-frequency components from the image. For example, a case where the finger 43 touches the display panel 19 is considered. In this case, the fingerprint closely adheres to the display panel 19, and thus a portion corresponding to the fingerprint in the image is slightly blurred. In addition, in this case, the image includes fine patterns. From these characteristics of the image, in the case of detecting the fingerprint as the living body, it is preferable to retrieve high-frequency components from the image.

In a case of detecting a vein as the living body, the display device 1031 may read, as an image, the distribution of infrared rays detected by the plurality of electromagnetic wave sensor devices 101 and retrieve low frequency components from the image. For example, a case where the finger 43 touches the display panel 19 is considered. In this case, the vein is away from the display panel 19, and thus a portion corresponding to the vein in the image is largely blurred. From the characteristics of the image, in the case of detecting the vein as the living body, it is preferable to retrieve the low frequency components from the image.

Note that, instead of the display device 1031, the display device 1032 may be applied.

Fourth Embodiment

Figure 12:
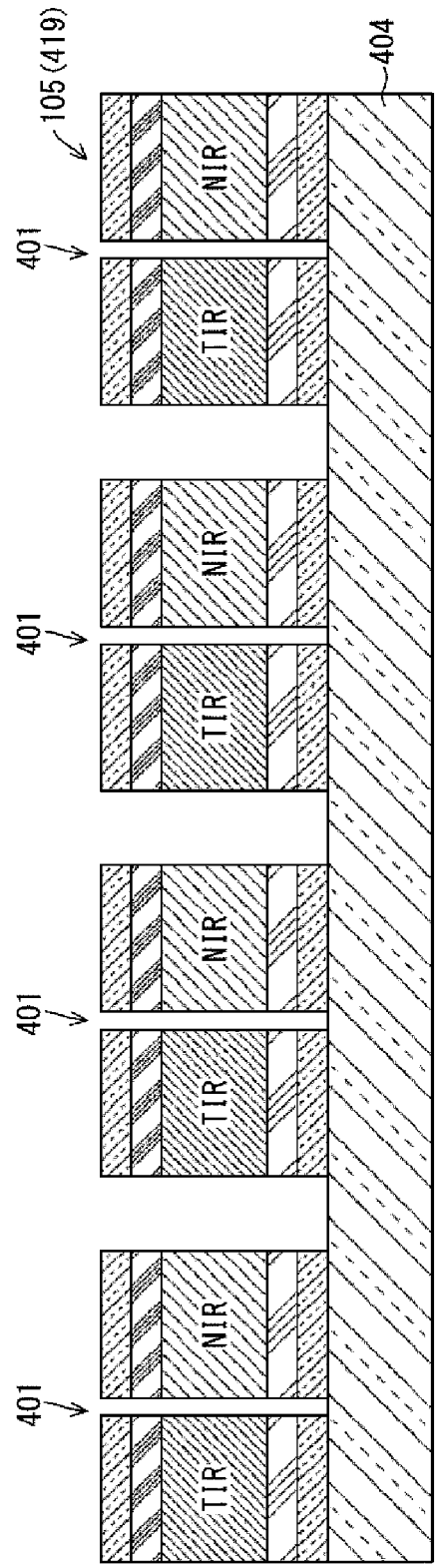
FIG. 12 is a diagram illustrating a schematic configuration of a display device according to a fourth embodiment of the disclosure, corresponding to a cross-sectional view taken along arrow B-B in FIG. 9.

FIG. 12 is a cross-sectional view illustrating a schematic configuration of a display device 105 according to the present embodiment. The display device 105 is a modified example of the display device 1031, and is different from the display device 1031 in points described below. Note that FIG. 12 corresponds to a cross-sectional view taken along arrow B-B in FIG. 9.

In the display device 105, a display panel 419 is a transparent panel. Thus, in the display device 105, a TFT substrate 404 is transparent. In each of a plurality of electromagnetic wave sensor devices 401 provided in the display device 105, electrodes corresponding to the electrode 5, the electrode 9, the electrode 12, and the electrode 16 illustrated in FIG. 1 are each a transparent electrode. As a result, the plurality of electromagnetic wave sensor devices 401 can absorb electromagnetic waves from both surfaces of the display panel 419. That is, the plurality of electromagnetic wave sensor devices 401 operate with respect to both the surfaces of the display panel 419, which is a transparent panel.

Note that, the respective absorption layers corresponding to the NIR absorption layer 7 and the TIR absorption layer 14 illustrated in FIG. 1, which are composed of quantum dots, and the respective light-emitting layers corresponding to the quantum dot light-emitting layer (red) 25, the quantum dot light-emitting layer (green) 31, and the quantum dot light-emitting layer (blue) 36 illustrated in FIG. 4 are easy to form thinly, so that it is easy to enhance transmittance.

In a similar manner to that of detection of the living body by the display device 1031 (see FIG. 11), the display device 105 can detect a living body. In this case, it is possible to detect the living body even when the finger 43 touches any of both the surfaces of the display panel 419. Accordingly, detecting the living body with use of the display device 105 enables a double-sided touch sensor.

Fifth Embodiment

Figure 13:
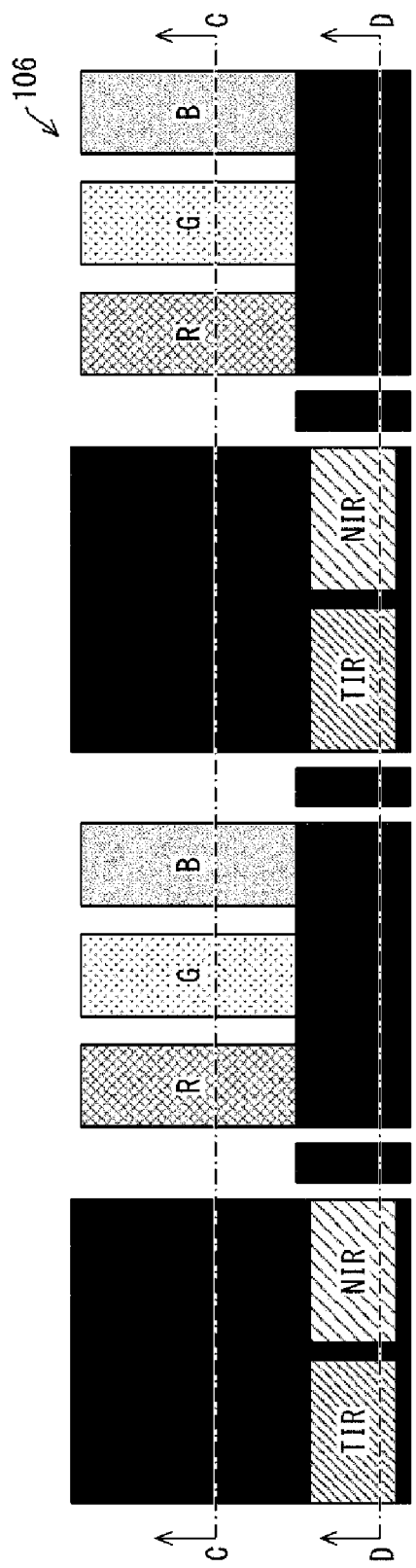
FIG. 13 is a diagram illustrating a pixel structure of a display device according to a fifth embodiment of the disclosure.

FIG. 13 is a diagram illustrating a pixel structure of a display device 106 according to the present embodiment. The display device 106 is a modified example of the display device 1031 similarly to the display device 105 (see FIG. 12). The display device 106 is different from the display device 105 in points described below. Note that FIG. 14 is a cross-sectional view taken along arrow C-C in FIG. 13, and FIG. 15 is a cross-sectional view taken along arrow D-D in FIG. 13.

In the display device 106, a display panel 519 is a double-sided display panel. This allows display by one surface 519a of the display panel 519 and display by the other surface 519b of the display panel 519 to be performed independently of each other.

Figure 14:
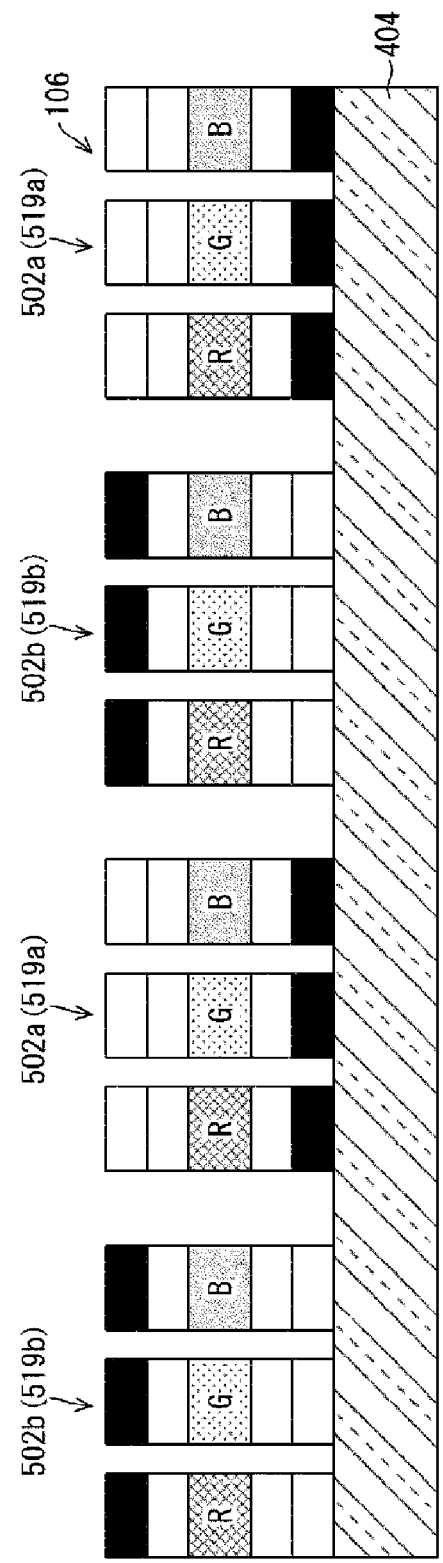
FIG. 14 is a cross-sectional view taken along arrow C-C in FIG. 13.
Figure 15:
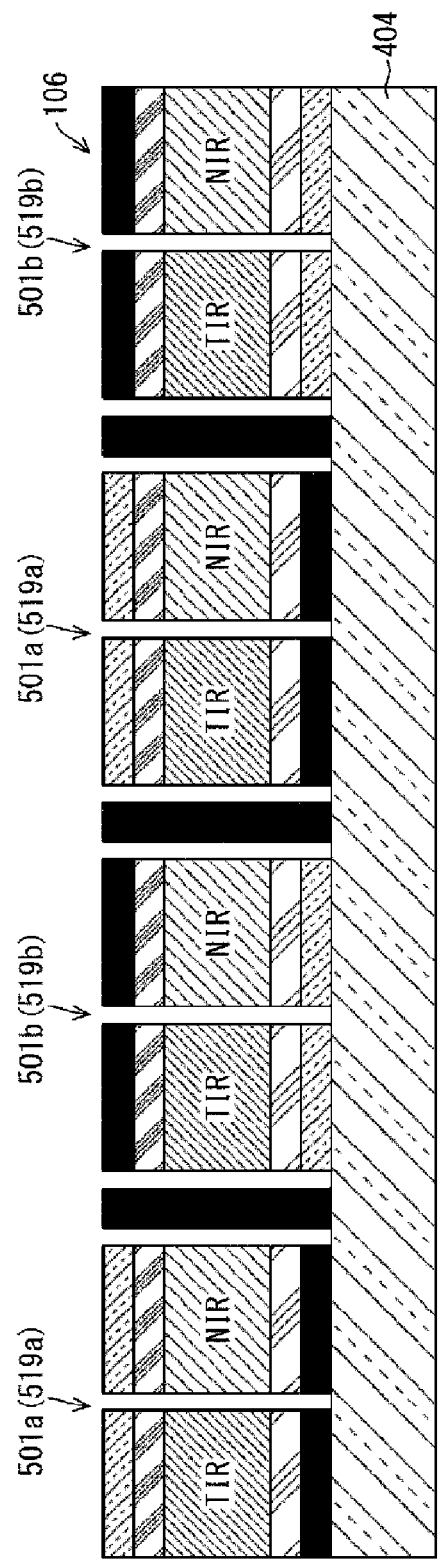
FIG. 15 is a cross-sectional view taken along arrow D-D in FIG. 13.

More specifically, as illustrated in FIG. 14, in a plurality of pixels 502a provided in the display device 106, the respective electrodes corresponding to the electrode 23, the electrode 29, and the electrode 34 illustrated in FIG. 4 are non-transparent, while the respective electrodes corresponding to the electrode 27, the electrode 33, and the electrode 38 illustrated in FIG. 4 are transparent. Thus, the plurality of pixels 502a emit light to only one surface 519a of the display panel 519, which is a double-sided display panel.

On the other hand, in a plurality of pixels 502b provided in the display device 106, the respective electrodes corresponding to the electrode 23, the electrode 29, and the electrode 34 illustrated in FIG. 4 are transparent, while the respective electrodes corresponding to the electrode 27, the electrode 33, and the electrode 38 illustrated in FIG. 4 are non-transparent. Thus, the plurality of pixels 502b emit light to only the other surface 519b of the display panel 519, which is a double-sided display panel.

Furthermore, in the display device 106, in electromagnetic wave sensor devices 501a among the plurality of electromagnetic wave sensor devices 501, the respective electrodes corresponding to the electrode 5 and the electrode 12 illustrated in FIG. 1 are non-transparent, while the respective electrodes corresponding to the electrode 9 and the electrode 16 illustrated in FIG. 1 are transparent. The electromagnetic wave sensor device 501a can be said to be a first set that operates with respect to only the one surface 519a of the display panel 519, which is a double-sided display panel.

On the other hand, among the plurality of electromagnetic wave sensor devices 501 provided in the display device 106, in electromagnetic wave sensor devices 501b, the respective electrodes corresponding to the electrode 5 and the electrode 12 illustrated in FIG. 1 are transparent, while the respective electrodes corresponding to the electrode 9 and the electrode 16 illustrated in FIG. 1 are non-transparent. The electromagnetic wave sensor device 501b can be said to be a second set that operates with respect to only the other surface 519b of the display panel 519, which is a double-sided display panel.

The display device 106 can be interpreted as follows. Each of the plurality of electromagnetic wave sensor devices 501 (501a, 501b) includes transparent electrodes and non-transparent electrodes. In a top view of the one surface 519a, in the electromagnetic wave sensor device 501a included in the first set, the transparent electrodes (respective electrodes corresponding to the electrode 9 and the electrode 16 illustrated in FIG. 1) are disposed closer to a front side than the non-transparent electrodes (respective electrodes corresponding to the electrode 5 and the electrode 12 illustrated in FIG. 1) are. In a top view of the other surface 519b, in the electromagnetic wave sensor device 501b included in the second set, the transparent electrodes (respective electrodes corresponding to the electrode 5 and the electrode 12 illustrated in FIG. 1) are disposed closer to the front side than the non-transparent electrodes (respective electrodes corresponding to the electrode 9 and the electrode 16 illustrated in FIG. 1) are.

In the display device 106, an operation of the electromagnetic wave sensor device 501a with respect to the one surface 519a of the display panel 519 and an operation of the electromagnetic wave sensor device 501b with respect to the other surface 519b of the display panel 519 can be made independent of each other.

Note that, as illustrated in FIGS. 13 to 15, preferably, the pixel 502b is adjacent to the electromagnetic wave sensor device 501a, and the pixel 502a is adjacent to the electromagnetic wave sensor device 501b. In other words, the light-receiving surfaces of the electromagnetic wave sensor devices 501 (501a and 501b) and the light-emitting surfaces of the pixels 502 (502a and 502b) are preferably arranged in a staggered manner. With such an arrangement, light from the pixel 502 adjacent to the electromagnetic wave sensor device 501 can be prevented from being incident on the electromagnetic wave sensor device 501, so that an effect of the display on the electromagnetic wave sensor device 501 can be reduced.

Sixth Embodiment

Figure 16:
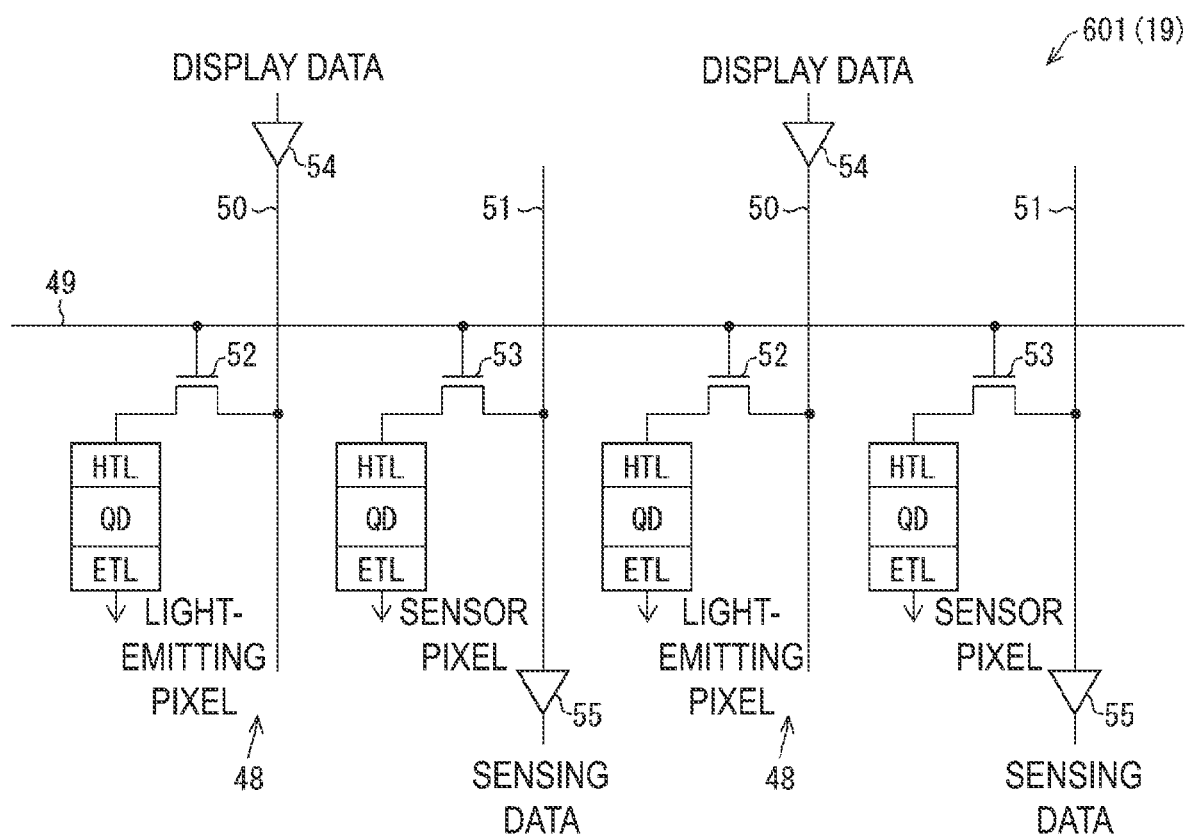
FIG. 16 is a circuit diagram illustrating a modified example of a display panel and an electromagnetic wave sensor device according to a sixth embodiment of the disclosure.

FIG. 16 is a circuit diagram illustrating a modified example 601 of the display panel 19 and the electromagnetic wave sensor device 101. In the modified example 601, each of two subpixels 48 corresponds to any one of the red subpixel 20, the green subpixel 21, and the blue subpixel 22. In the modified example 601, one of the two subpixels 48 is disposed between the first sensor 1 and the second sensor 2. Furthermore, in the modified example 601, the display panel 19 includes a gate line 49, two source lines 50 and two source lines 51, two transistors 52 and two transistors 53, two digital-analog converters (DACs) 54, and two analog-digital converters (ADCs) 55.

The gate line 49 is a signal line for driving gates of the transistors 52. The source line 50 is a signal line for driving a source of the corresponding transistor 52. The DAC 54 is provided on the corresponding source line 50, converts data for display by the subpixel 48, which has been input into the DAC 54, into an analog signal from a digital signal, and supplies the converted data to a source of the corresponding transistor 52. As the circuit composed of the gate line 49, the source lines 50, the transistors 52, and the DACs 54, a known circuit in the field of the display device can be applied.

The gate line 49 is also connected to gates of the transistors 53 and also functions as a signal line for driving the gates of the transistors 53. The source line 51 is connected to a source of the corresponding transistor 53 and is a signal line for driving the source of the transistor 53. A drain of the transistor 53 is connected to the corresponding first sensor 1 or the corresponding second sensor 2. The ADC 55 is provided on the corresponding source line 51, converts data of a result of detection by the first sensor 1 or the second sensor 2, which has been input into the ADC 55, into a digital signal from an analog signal, and outputs the converted data as sensing data.

According to the modified example 601, at the time of driving the transistors 52 by the gate line 49, outputs of the DACs 54 can be output to the subpixels 48, and an output from each of the first sensor 1 and the second sensor 2 can be output as sensing data. As a result, display by the display panel 19 and detection by the electromagnetic wave sensor device 601 can be performed simultaneously.

In the modified example 601, the subpixels 48, which are quantum dot light-emitting elements, and the electromagnetic wave sensor device 601 are connected to the same gate line 49 provided in the display panel 19. This can reduce the number of wiring lines in the modified example 601 illustrated in FIG. 14.

Figure 17:
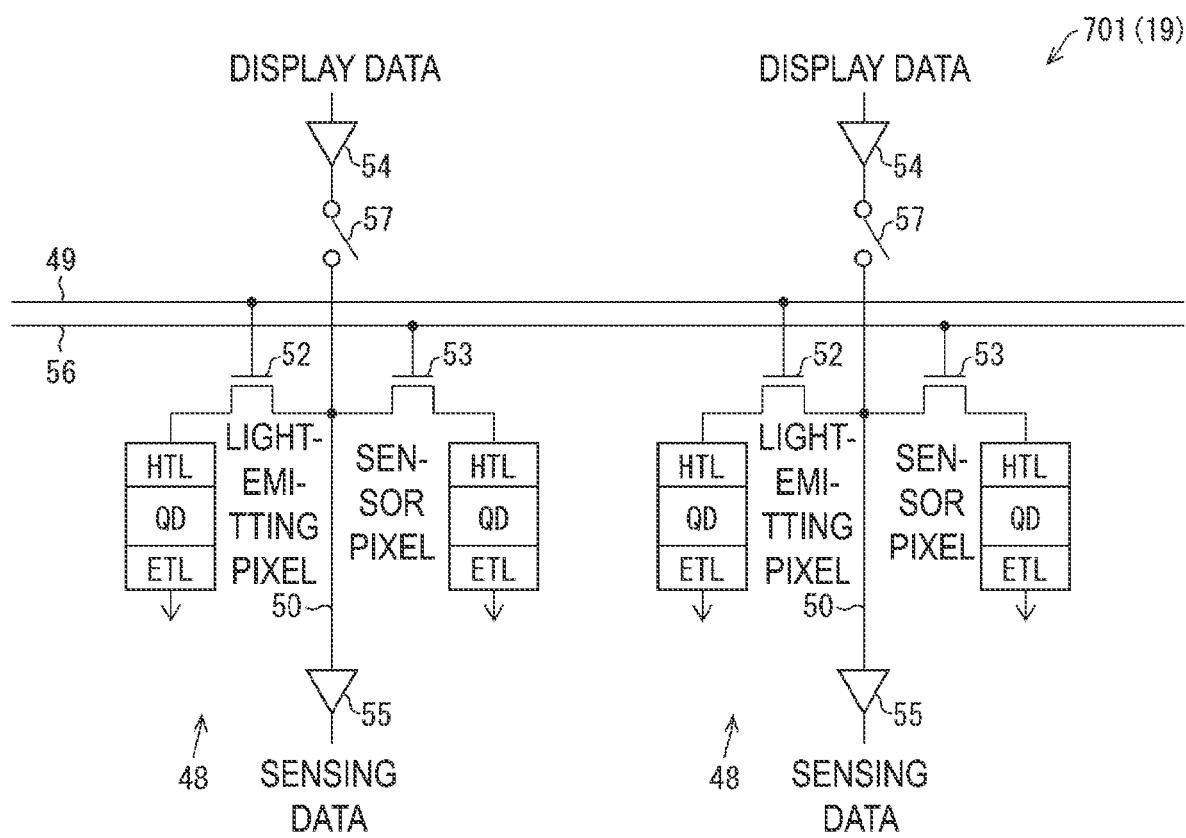
FIG. 17 is a circuit diagram illustrating another modified example of the display panel and the electromagnetic wave sensor device according to the sixth embodiment of the disclosure.

FIG. 17 is a circuit diagram illustrating another modified example 701 of the display panel 19 and the electromagnetic wave sensor device 101. The modified example 701 is different from the modified example 601 in points described below.

In the modified example 701, a gate line 56 is provided in addition to the gate line 49. The gates of the transistors 53 are connected to the gate line 56 instead of the gate line 49. Furthermore, in the modified example 701, the source lines 51 are omitted. A source of the transistor 53 is connected to the corresponding source line 50. The ADC 55 is provided on the corresponding source line 50, converts data of a result of detection by the first sensor 1 or the second sensor 2, which has been input into the ADC 55, into a digital signal from an analog signal, and outputs the converted data as sensing data. In the modified example 701, a switch 57 is provided between the corresponding DAC 54 and a connection portion of the corresponding source line 50 with a source of the corresponding transistor 53.

According to the modified example 701, at the time of driving the transistors 52 by the gate line 49, the switches 57 are closed, and the outputs of the DACs 54 are supplied to the subpixels 48. In addition, according to the modified example 701, at the time of driving the transistors 53 by the gate line 56, the switches 57 are opened, and the output from each of the first sensor 1 and the second sensor 2 can be output as sensing data. This allows display by the display panel 19 and detection by the electromagnetic wave sensor device 701 to be alternately performed.

In the modified example 701, the subpixel 48, which is a quantum dot light-emitting element, and the electromagnetic wave sensor device 701 are connected to the same source line 50 provided in the display panel 19. This can reduce the number of wiring lines in the modified example 701 illustrated in FIG. 17.

Supplement

An electromagnetic wave sensor device according to a first aspect of the disclosure includes a first sensor configured to perform an output in accordance with electromagnetic waves absorbed by a first quantum dot, an upper limit wavelength of electromagnetic waves absorbable by the first quantum dot being a first wavelength; a second sensor configured to perform an output in accordance with electromagnetic waves absorbed by a second quantum dot different from the first quantum dot, an upper limit wavelength of electromagnetic waves absorbable by the second quantum dot being a second wavelength longer than the first wavelength; and a calculation unit configured to calculate a difference between the output of the second sensor and the output of the first sensor.

According to the configuration described above, it is possible to significantly improve a detection sensitivity of electromagnetic waves, particularly a detection sensitivity of infrared rays by using a sensor that performs an output in accordance with electromagnetic waves absorbed by a quantum dot, as compared to a case where a sensor including a thermopile, a photodiode, or the like is used.

Here, no lower wavelength limit of electromagnetic waves that can be absorbed by a quantum dot is determined, and thus, it is difficult to selectively detect only electromagnetic waves having a desired wavelength by using only one sensor that performs an output in accordance with electromagnetic waves absorbed by a quantum dot. Thus, by calculating a difference between an output of the second sensor and an output of the first sensor, only electromagnetic waves having a desired wavelength (i.e., greater than the first wavelength and the second wavelength or less) can be selectively detected.

An electromagnetic wave sensor device according to a second aspect of the disclosure is the electromagnetic wave sensor device of the first aspect in which the first wavelength is a wavelength of near-infrared rays, and the second wavelength is a wavelength of thermal infrared rays.

An electromagnetic wave sensor device according to a third aspect of the disclosure is the electromagnetic wave sensor device of the first aspect in which the first quantum dot is a Group IV-VI semiconductor including Pb or a Group III-V semiconductor including In, and the second quantum dot is a Group III-V semiconductor including In or Ga.

A display device according to a fourth aspect of the disclosure includes a display panel configured to perform display by visible light, and the display panel includes at least one electromagnetic wave sensor device of any one of the first to third aspects in which both the first quantum dot and the second quantum dot is capable of absorbing visible light.

As to the electromagnetic wave sensor device, even when visible light based on the display of the display panel is absorbed by the first quantum dot and the second quantum dot, the calculation unit cancels a component related to the visible light. This allows fabrication of a display device including an electromagnetic wave sensor device that does not depend on display of the display panel.

A display device according to a fifth aspect of the disclosure is the display device of the fourth aspect in which the display panel performs the display using a quantum dot light-emitting element.

According to the configuration described above, the structure of the first sensor and the second sensor can be made substantially the same as the structure of the quantum dot light-emitting element, and thus the first sensor, the second sensor, and the quantum dot light-emitting element can be formed collectively, so that production man-hours can be reduced.

In addition, the quantum dot light-emitting element does not emit infrared rays, and thus it is not necessary to provide an infrared cut filter on a preceding stage of the first sensor and the second sensor. Accordingly, omitting the infrared cut filter can reduce the number of components. Furthermore, in a case where the electromagnetic wave sensor device is intended to detect infrared rays, omitting the infrared cut filter enables significant suppression of a substantial decrease in sensitivity of the electromagnetic wave sensor device.

A display device according to a sixth aspect of the disclosure is the display device of the fifth aspect in which the quantum dot light-emitting element and the electromagnetic wave sensor device are connected to the same gate line provided in the display panel.

According to the configuration described above, the number of wiring lines can be reduced.

A display device according to a seventh aspect of the disclosure is the display device of the fifth aspect in which the quantum dot light-emitting element and the electromagnetic wave sensor device are connected to the same source line provided in the display panel.

According to the configuration described above, the number of wiring lines can be reduced.

A display device according to an eighth aspect of the disclosure is the display device of any one of the fourth to seventh aspects in which a plurality of the electromagnetic wave sensor devices are provided, and the plurality of the electromagnetic wave sensor devices are arranged two-dimensionally.

A display device according to a ninth aspect of the disclosure is the display device of the eighth aspect in which the plurality of the electromagnetic wave sensor devices detect distribution of infrared rays, and the display device detects a living body, based on the distribution of infrared rays detected by the plurality of the electromagnetic wave sensor devices.

A display device according to a tenth aspect of the disclosure is the display device of the eighth or ninth aspect in which the display panel is a transparent panel, and the plurality of the electromagnetic wave sensor devices are configured to operate with respect to both surfaces of the transparent panel.

A display device according to an eleventh aspect of the disclosure is the display device of the eighth or ninth aspect in which the display panel is a double-sided display panel, and the plurality of the electromagnetic wave sensor devices include a first set configured to operate with respect to only one surface of the double-sided display panel, and a second set configured to operate with respect to only the other surface of the double-sided display panel.

A display device according to a twelfth aspect of the disclosure is the display device of the eleventh aspect in which each of the plurality of the electromagnetic wave sensor devices includes a transparent electrode and a non-transparent electrode; in the electromagnetic wave sensor device included in the first set, the transparent electrode is disposed closer to a front side than the non-transparent electrode is in a top view of the one surface; and in the electromagnetic wave sensor device included in the second set, the transparent electrode is disposed closer to a front side than the non-transparent electrode is in a top view of the other surface.

The disclosure is not limited to each of the embodiments described above, and various modifications may be made within the scope of the claims. Embodiments obtained by appropriately combining technical approaches disclosed in each of the different embodiments also fall within the technical scope of the disclosure. Furthermore, novel technical features can be formed by combining the technical approaches disclosed in each of the embodiments.

The invention claimed is:

1. An electromagnetic wave sensor device comprising:
   a first sensor that generates a first output based on first electromagnetic waves absorbed by a first quantum dot, an upper limit wavelength of first electromagnetic waves absorbable by the first quantum dot being a first wavelength;
   a second sensor that generates a second output based on second electromagnetic waves absorbed by a second quantum dot, different from the first quantum dot, an upper limit wavelength of second electromagnetic waves absorbable by the second quantum dot being a second wavelength that is longer than the first wavelength; and
   a calculation unit that calculates a difference between the second output and the first output.

2. The electromagnetic wave sensor device according to claim 1,
   wherein the first wavelength is a wavelength of near-infrared rays, and
   the second wavelength is a wavelength of thermal infrared rays.

3. The electromagnetic wave sensor device according to claim 1,
   wherein the first quantum dot is a Group IV-VI semiconductor including Pb or a Group III-V semiconductor including In, and
   the second quantum dot is a Group III-V semiconductor including In or Ga.

4. A display device comprising:
   a display panel that displays visible light,
   wherein the display panel includes at least one electromagnetic wave sensor device being the electromagnetic wave sensor device according to claim 1, in which both the first quantum dot and the second quantum dot are capable of absorbing visible light.

5. The display device according to claim 4,
   wherein the display panel uses a quantum dot light-emitting element for displaying.

6. The display device according to claim 5,
   wherein the quantum dot light-emitting element and the electromagnetic wave sensor device are connected to a same gate line provided in the display panel.

7. The display device according to claim 5,
   wherein the quantum dot light-emitting element and the electromagnetic wave sensor device are connected to a same source line provided in the display panel.

8. The display device according to claim 4, further comprising:
   a plurality of electromagnetic wave sensor devices, including the electromagnetic wave sensor device,
   wherein the plurality of electromagnetic wave sensor devices is arranged two-dimensionally.

9. The display device according to claim 8,
   wherein the plurality of electromagnetic wave sensor devices detects a distribution of infrared rays, and
   the display device detects a living body, based on the distribution of the infrared rays detected by the plurality of electromagnetic wave sensor devices.

10. The display device according to claim 8,
    wherein the display panel is a transparent panel, and
    the plurality of electromagnetic wave sensor devices operates with respect to both surfaces of the transparent panel.

11. The display device according to claim 8,
    wherein the display panel is a double-sided display panel, and
    the plurality of electromagnetic wave sensor devices includes a first set that operates with respect to only one surface of the double-sided display panel, and a second set that operates with respect to only the other surface of the double-sided display panel.

12. The display device according to claim 11,
    wherein each of the plurality of electromagnetic wave sensor devices includes a transparent electrode and a non-transparent electrode,
    in each of the plurality of electromagnetic wave sensor devices included in the first set, the transparent electrode is disposed, in a top view of the one surface, closer to a front side of the one surface than the non-transparent electrode is, and
    in each of the plurality of electromagnetic wave sensor devices included in the second set, the transparent electrode is disposed, in a top view of the other surface, closer to a front side of the other surface than the non-transparent electrode is.

13. The display device according to claim 1,
    wherein the calculation unit selectively detects only each electromagnetic wave that has a wavelength greater than the first wavelength and equal to or less than the second wavelength, by calculating the difference between the second output and the first output.

* * * * *